United States Patent
Zhang et al.

(10) Patent No.: US 12,437,880 B2
(45) Date of Patent: Oct. 7, 2025

(54) CONSISTENCY EVALUATION METHOD FOR TRADITIONAL EXTRACTION PROCESS AND MODERN EXTRACTION PROCESS OF TRADITIONAL CHINESE MEDICINE COMPOUND PREPARATION

(71) Applicant: SICHUAN ACADEMY OF CHINESE MEDICINE SCIENCES, Chengdu (CN)

(72) Inventors: Aijun Zhang, Chengdu (CN); Junning Zhao, Chengdu (CN); Shan Dai, Chengdu (CN); Shuai Li, Chengdu (CN); Hongmei Zhu, Chengdu (CN); Jin Zeng, Chengdu (CN); Jiuzhou Mao, Chengdu (CN)

(73) Assignee: SICHUAN ACADEMY OF CHINESE MEDICINE SCIENCES, Chengdu (CN)

(*) Notice: Subject to any disclaimer, the term of this patent is extended or adjusted under 35 U.S.C. 154(b) by 456 days.

(21) Appl. No.: 18/055,427

(22) Filed: Nov. 15, 2022

(65) Prior Publication Data
US 2023/0223156 A1    Jul. 13, 2023

(30) Foreign Application Priority Data
Jan. 13, 2022   (CN) .......................... 202210034441.8

(51) Int. Cl.
*G16H 70/40*    (2018.01)
*G06Q 10/0639*  (2023.01)
*G16H 20/10*    (2018.01)

(52) U.S. Cl.
CPC ....... *G16H 70/40* (2018.01); *G06Q 10/06393* (2013.01); *G06Q 10/06395* (2013.01); *G16H 20/10* (2018.01)

(58) Field of Classification Search
CPC ......... G16H 70/40; G16H 20/90; G16H 20/10
See application file for complete search history.

(56) References Cited

FOREIGN PATENT DOCUMENTS

| CN | 1850121 A | * | 10/2006 | |
|---|---|---|---|---|
| CN | 105787262 A | * | 7/2016 | ........... G06F 16/215 |
| CN | 106990214 A | * | 7/2017 | ............ G01N 33/15 |

* cited by examiner

*Primary Examiner* — Lam S Nguyen
(74) *Attorney, Agent, or Firm* — Chiesa Shahinian & Giantomasi PC

(57) ABSTRACT

The present disclosure provides a consistency evaluation method for a traditional extraction process and a modern extraction process of a traditional Chinese medicine (TCM) compound preparation. In the present disclosure, the reference correlation degree is calculated based on the relative deviation. The reference correlation degree is within a threshold interval of $[-\infty, 1]$. If the relative deviation is 0, the reference correlation degree is 100%, and at the moment, the quality of a modern extraction sample is completely consistent with that of a reference sample. Thus, compared with the relative deviation, the reference correlation degree can represent a quality difference between the modern extraction sample and the reference sample more intuitively and clearly. Comprehensive evaluation conducted in combination of a subjective weighting method and an objective weighting method reflects the subjective will of a decision maker, but does not depart from actual data, making a final weighting result more persuasive.

15 Claims, No Drawings

CONSISTENCY EVALUATION METHOD FOR TRADITIONAL EXTRACTION PROCESS AND MODERN EXTRACTION PROCESS OF TRADITIONAL CHINESE MEDICINE COMPOUND PREPARATION

CROSS REFERENCE TO RELATED APPLICATION

This application claims the benefit and priority of Chinese Patent Application No. 202210034441.8, filed Jan. 13, 2022; the disclosure of which is incorporated by reference herein in its entirety as part of the present application.

TECHNICAL FIELD

The present disclosure relates to the technical field of evaluation methods, in particular to a consistency evaluation method for a traditional extraction process and a modern extraction process of a traditional Chinese medicine (TCM) compound preparation.

BACKGROUND

The *Law of the People's Republic of China on Traditional Chinese Medicine* adopted in 2016 has pointed out that non-clinical safety research data can be merely provided for a product of a classic famous prescription at the time of application for a drug approval number. In 2018, the National Administration of Traditional Chinese Medicine released the *Catalog of Ancient Classic Prescriptions* (*the First Batch*), which included a total of 100 prescriptions, and listed the prescription name, source, prescription, preparation method, usage and dosage form of each classic famous prescriptions in detail. The policy encourages and supports the research and development of ancient classic prescriptions, which has become a golden key to dig for the treasure of TCM, substantially shortening the research and development cycle of a new drug, reducing research and development costs, and lowering the research and development risk. In accordance with the *Technical Guiding Principles for Pharmaceutical Research of Traditional Chinese Medicine Compound Preparations Managed by the Catalog of Ancient Classic Prescriptions* (*Trial*) issued by the Center for Drug Evaluation, National Medical Products Administration in August 2021, the reference sample refers to a sample investigated and prepared according to the key information of ancient classic prescriptions released by the state and methods documented in ancient literature. The development of TCM compound preparations from classic famous prescriptions should be based on the principle of compliance with ancient methods. However, in the scale-up production, samples substantially vary with production equipment, heating methods, and heating levels, thereby leading to inconsistent quality of scale-up production samples and reference samples. Therefore, ensuring the consistent quality of products manufactured by the production process and the traditional process is the key to the success of the study of TCM compound preparations from classic famous prescriptions.

There are still a plurality of problems in achieving the consistency of quality of products manufactured by traditional and modern processes for TCM compound preparations from classic famous prescriptions, such as extraction, concentration, drying and other processes, among which the extraction process is a challenge. To realize the transformation of a traditional extraction process into a modern extraction process, the reference sample should be used as the measurement standard to ensure that the established modern extraction process can not only meet the quality requirements of the reference sample, but also meet the production conditions of the modern technology. The orthogonal test, uniform design, and Box-Behnken response surface methodology commonly used in the research methods of TCM extraction processes are all evaluated for the purpose of extracting the components to the utmost extent, but the reference samples are prepared according to the key information of ancient classic prescriptions released by the state and methods documented in ancient literature, in order to bear the effectiveness and safety of the ancient classic prescriptions. Therefore, this is inconsistent with the requirements of compliance with ancient methods of the TCM compound preparations from classic famous prescriptions.

SUMMARY

In view of this, an objective of the present disclosure is to provide a consistency evaluation method for a traditional extraction process and a modern extraction process of a TCM compound preparation. The evaluation method provided by the present disclosure can evaluate the modern extraction process accurately and comprehensively.

To achieve the above objective, the present disclosure provides the following technical solution:

The present disclosure provides a consistency evaluation method for a traditional extraction process and a modern extraction process of a TCM compound preparation, including the following steps:

step 1, extracting the TCM compound preparation by using the modern extraction process to obtain a modern extraction sample;

step 2, determining evaluation indexes of a reference sample and the modern extraction sample to obtain measurement data of each evaluation index of the reference sample and the modern extraction sample, where the reference sample is obtained by extracting the TCM compound preparation by the traditional extraction process;

step 3, based on the measurement data of each evaluation index of the reference sample, calculating a relative deviation of each evaluation index of the modern extraction sample;

step 4, according to the relative deviation of each evaluation index, calculating the reference correlation degree of each evaluation index;

step 5, determining a subjective weight coefficient and an objective weight coefficient of each evaluation index using a subjective weighting method and an objective weighting method based on the measurement data of each evaluation index of the modern extraction sample; calculating a comprehensive weight coefficient according to the subjective weight coefficient and the objective weight coefficient; and step 6, conducting comprehensive scoring on the reference correlation degree of each evaluation index to obtain a score of the modern extraction sample according to the comprehensive weight coefficient, where there is no order of precedence between steps 4 and 5.

Preferably, a quantity of the evaluation indexes may be ≥3; the evaluation indexes may include at least one quantitative evaluation index and at least two evaluation indexes that represent overall quality attributes.

Preferably, the traditional extraction process includes processing.

Preferably, the relative deviation has a calculation formula represented by formula 1:

$$Rd_{i,j}=|X_{i,j}-S_j|/S_j \qquad \text{formula 1};$$

where $X_{i,j}$ represents a measured value under a j-th (j=1, 2, ..., n) evaluation index of an i-th (i=1, 2, ..., m) sample from modern extraction samples; $S_j$ represents the measured value under the j-th (j=1, 2, ..., n) evaluation index of the reference sample; $Rd_{i,j}$ represents the relative deviation under the j-th (j=1, 2, ..., n) evaluation index of an i-th (i=1, 2, ..., m) sample.

Preferably, the reference correlation degree has a calculation formula represented by formula 2:

$$SR_{i,j}=(1-Rd_{i,j})\times 100\% \qquad \text{formula 2};$$

where $SR_{i,j}$ represents the reference correlation degree under the j-th (j=1, 2, ..., n) evaluation index of the i-th (i=1, 2, ..., m) sample.

Preferably, the subjective weighting method includes an analytical hierarchy process (AHP), a least squares method, a G1 method, a Delphi method, a binomial coefficient method, or a decision alternative ratio evaluation (DARE) system.

Preferably, the objective weighting method includes an information entropy weight method, a principal component analysis (PCA), a mean square error method, or a multi-objective programming (MOP) method.

Preferably, the subjective weighting method is the AHP; the objective weighting method is the information entropy weight method.

Preferably, the comprehensive weight coefficient has a calculation formula represented by formula 3:

$$W_j = \frac{W_j^s \times W_j^o}{\sum_{j=1}^{n} W_j^s \times W_j^o}; \qquad \text{formula 3}$$

where $W_j^o$ represents the objective weight coefficient under a j-th (j=1, 2, ..., n) evaluation index, and $W_j^s$ represents the subjective weight coefficient under the j-th (j=1, 2, ..., n) evaluation index.

Preferably, the comprehensive scoring has a calculation formula represented by formula 4:

$$M = \sum_{j=1}^{n} SR_{ij} \times W_j; \qquad \text{formula 4}$$

where $SR_{i,j}$ represents the reference correlation degree under a j-th (j=1, 2, ..., n) evaluation index of an i-th (i=1, 2, ..., m) sample; $W_j$ is the comprehensive weight coefficient under the j-th (j=1, 2, ..., n) evaluation index.

The present disclosure provides a consistency evaluation method for a traditional extraction process and a modern extraction process of a TCM compound preparation, including the following steps: step 1, extracting the TCM compound preparation by using the modern extraction process to obtain a modern extraction sample; step 2, determining evaluation indexes of a reference sample and the modern extraction sample to obtain measurement data of each evaluation index of the reference sample and the modern extraction sample, where the reference sample is obtained by extracting the TCM compound preparation by the traditional extraction process; step 3, based on the measurement data of each evaluation index of the reference sample, calculating a relative deviation of each evaluation index of the modern extraction sample; step 4, according to the relative deviation of each evaluation index, calculating the reference correlation degree of each evaluation index; step 5, determining a subjective weight coefficient and an objective weight coefficient of each evaluation index using a subjective weighting method and an objective weighting method based on the measurement data of each evaluation index of the modern extraction sample; calculating a comprehensive weight coefficient according to the subjective weight coefficient and the objective weight coefficient; and step 6, conducting comprehensive scoring on the reference correlation degree of each evaluation index to obtain a score of the modern extraction sample according to the comprehensive weight coefficient; there is no order of precedence between steps 4 and 5.

The quality of the reference sample is not defined as a fixed value, but a range, namely, between 70% and 130% of the quality of the reference sample, which is in line with the quality standard of the classic famous prescription. The modern extraction process is investigated on this basis. The modern extraction example and the reference sample are compared with respect to the quality range, and the consistency between the modern extraction example and the reference sample is examined. The evaluation method provided by the present disclosure calculates the reference correlation degree based on the relative deviation. The reference correlation degree is within a threshold interval of $[-\infty, 1]$. If the relative deviation is 0, the reference correlation degree is 100%, and at the moment, the quality of the modern extraction sample is completely consistent with that of the reference sample. Thus, compared with the relative deviation, the reference correlation degree can represent a quality difference between the modern extraction sample and the reference sample more intuitively and clearly. If the value of the reference correlation degree is greater than 70%, it can be considered that the modern extraction sample meets the quality requirements of the reference sample. Using a single value, instead of a confidence interval, to represent the quality consistency of the modern extraction sample and the reference sample is conducive to the screening of parameters of the modern extraction process of the classic famous prescription by using a comprehensive weighting method. In the present disclosure, comprehensive evaluation conducted in combination of the subjective weighting method and the objective weighting method reflects the subjective will of a decision maker, but does not depart from actual data, making a final weighting result more persuasive. The evaluation method provided by the present disclosure solves the problem of conversion of the traditional extraction process of the classic famous prescription into the modern extraction process at present, and ensures that an established modern extraction process not only can meet the quality requirement of the reference sample, but also can meet the production conditions of a modern process.

Further, the quantity of the evaluation indexes may be ≥3 in the present disclosure; at least one quantitative evaluation index and at least two evaluation indexes that represent overall quality attributes may be included for evaluation, so as to enrich a quantity of information contained in evaluation results and make reliability thereof higher reliability; the evaluation indexes avoid the problem of biased evaluation due to a single index or incomplete selection of indexes.

Further, the AHP is a subjective weighting method that artificially determines the importance of evaluation indexes, but human influence factors are relatively large because different people may have different opinions; the information entropy weight method is an objective weighting method, which obtains a final weight coefficient according to the change law of data, but cannot reflect the relationship between sovereign, minister, assistant and envoy drugs of TCM. An AHP-entropy weight method adopted in the evaluation method provided by the present disclosure is a combination of the subjective weighting method with the objective weighting method to comprehensively determine the weight coefficient, and the obtained data are systematic and comprehensive.

DETAILED DESCRIPTION

The various modules, systems and embodiments noted herein can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

The present disclosure provides the following technical solutions.

A consistency evaluation method for a traditional extraction process and a modern extraction process of a TCM compound preparation is provided, including the following steps:

step 1, extracting the TCM compound preparation by using the modern extraction process to obtain a modern extraction sample;

step 2, determining evaluation indexes of a reference sample and the modern extraction sample to obtain measurement data of each evaluation index of the reference sample and the modern extraction sample, where the reference sample is obtained by extracting the TCM compound preparation by the traditional extraction process;

step 3, based on the measurement data of each evaluation index of the reference sample, calculating a relative deviation of each evaluation index of the modern extraction sample;

step 4, according to the relative deviation of each evaluation index, calculating the reference correlation degree of each evaluation index;

step 5, determining a subjective weight coefficient and an objective weight coefficient of each evaluation index using a subjective weighting method and an objective weighting method based on the measurement data of each evaluation index of the modern extraction sample; calculating a comprehensive weight coefficient according to the subjective weight coefficient and the objective weight coefficient; and step 6, conducting comprehensive scoring on the reference correlation degree of each evaluation index to obtain a score of the modern extraction sample according to the comprehensive weight coefficient, where there is no order of precedence between steps 4 and 5.

In the present disclosure, unless otherwise specified, all raw materials used in the present disclosure are preferably commercially available products.

In the present disclosure, the TCM compound preparation is extracted to obtain the modern extraction sample by using the modern extraction process;

In the present disclosure, the modern extraction process is designed by adopting a single-factor experimental design, an orthogonal experimental design, a uniform design method, a star point design, a Doehlert design or a Box-Behnken experimental design for the TCM compound preparation. In the present disclosure, a quantity of the modern extraction samples may preferably be m.

In the present disclosure, the TCM compound preparation preferably includes a classic famous prescription; the classic famous prescription is a prescription documented in ancient books of TCM, complying with the provisions of the *Law of the People's Republic of China on Traditional Chinese Medicine*, being still widely used to date, and having definite therapeutic effects, obvious characteristics and advantages.

In the present disclosure, after the modern extraction sample is obtained, evaluation indexes of the reference sample and the modern extraction sample are determined to obtain the measurement data of the evaluation indexes of the reference sample and the modern extraction sample; the reference sample is the sample obtained by extracting the TCM compound preparation by the traditional extraction process.

In the present disclosure, the traditional extraction process preferably includes processing. In a specific embodiment of the present disclosure, the traditional extraction process is in particular preferably a processing method disclosed in the *Catalog of Ancient Classic Prescriptions (the First Batch)*.

Preferably, a quantity of the evaluation indexes may preferably be ≥3; the evaluation indexes may preferably include at least one quantitative evaluation index and at least two evaluation indexes that represent overall quality attributes. In the present disclosure, the quantity of the evaluation indexes may preferably be n.

After the evaluation indexes of the reference sample and the modern extraction sample are determined, the measurement data of the evaluation indexes of the reference sample and the modern extraction sample are obtained in the present disclosure.

The present disclosure has no special limitation on a method for obtaining the measurement data of the evaluation indexes of the reference sample and the modern extraction sample, as long as a measurement method well known to those skilled in the art may be used.

In the present disclosure, after the measurement data of the evaluation indexes of the reference sample and the modern extraction sample are obtained, the relative deviation of each evaluation index of the modern extraction sample is calculated based on the measurement data of each evaluation index of the reference sample.

In the present disclosure, the relative deviation has a calculation formula represented by formula 1:

$$Rd_{i,j} = |X_{i,j} - S_j|/S_j \quad \text{formula 1;}$$

where $X_{i,j}$ represents a measured value under a j-th (j=1, 2, ..., n) evaluation index of an i-th (i=1, 2, ..., m) sample from modern extraction samples; $S_j$ represents the measured value under the j-th (j=1, 2, ..., n) evaluation index of the reference sample; $Rd_{i,j}$ represents the relative deviation under the j-th (j=1, 2, ..., n) evaluation index of an i-th (i=1, 2, ..., m) sample.

In the present disclosure, after the relative deviation of each evaluation index of the modern extraction sample is obtained, the reference correlation degree of each evaluation index is calculated according to the relative deviation of each evaluation index.

In the present disclosure, the reference correlation degree is defined as follows: the reference correlation degree is defined as a value calculated according to formula 2 using the measurement data of each evaluation index of the reference sample extracted by the traditional extraction process as a standard value (S), the measurement data of each evaluation index of the modern extraction sample extracted by the modern extraction process as a measured value (X), and a plurality of indexes as evaluation indexes.

In the present disclosure, the reference correlation degree has a calculation formula represented by formula 2:

$$SR_{i,j} = (1 - Rd_{i,j}) \times 100\% \quad \text{formula 2;}$$

where $SR_{i,j}$ represents the reference correlation degree under the j-th (j=1, 2, ..., n) evaluation index of the i-th (i=1, 2, ..., m) sample.

In the present disclosure, after the reference correlation degree of each evaluation index is obtained, the subjective weight coefficient and the objective weight coefficient of each evaluation index are obtained using the subjective weighting method and the objective weighting method based on the measurement data of each evaluation index of the modern extraction sample; the comprehensive weight coefficient is calculated according to the subjective weight coefficient and the objective weight coefficient.

In the present disclosure, the subjective weighting method preferably includes an AHP, a least squares method, a G1 method, a Delphi method, a binomial coefficient method, or a DARE system, and further preferably the AHP. In the present disclosure, if the subjective weight coefficient of each evaluation index is determined by the AHP, it is preferable to use a sovereign, minister, assistant and envoy principle of TCM for scoring.

In the present disclosure, the objective weighting method preferably includes an information entropy weight method, a PCA, a mean square error method, or an MOP method, and further preferably the information entropy weight method.

In the present disclosure, the comprehensive weight coefficient has a calculation formula represented by formula 3:

$$W_j = \frac{W_j^s \times W_j^o}{\sum_{j=1}^{n} W_j^s \times W_j^o}; \quad \text{formula 3}$$

where $W_j$ is the comprehensive weight coefficient under a j-th (j=1, 2, ..., n) evaluation index, $W_j^s$ represents the objective weight coefficient under the j-th (j=1, 2, ..., n) evaluation index, and $W_j^o$ represents the subjective weight coefficient under the j-th (j=1, 2, ..., n) evaluation index.

In the present disclosure, after the comprehensive weight coefficient is obtained, the comprehensive scoring is conducted on the reference correlation degree of each evaluation index to obtain the score of the modern extraction sample according to the comprehensive weight coefficient.

In the present disclosure, the comprehensive scoring has a calculation formula represented by formula 4:

$$M = \sum_{j=1}^{n} SR_{ij} \times W_j \quad \text{formula 4}$$

where $SR_{i,j}$ represents the reference correlation degree under a j-th (j=1, 2, ..., n) evaluation index of an i-th (i=1, 2, ..., m) sample; $W_j$ is the comprehensive weight coefficient under the j-th (j=1, 2, ..., n) evaluation index.

In the present disclosure, a higher score of the modern extraction sample indicates that a composition of the modern extraction sample is closer to that of the reference sample, further indicating that a better modern extraction process for preparing the modern extraction sample can be used as the modern extraction process.

The consistency evaluation method for a traditional extraction process and a modern extraction process of a TCM compound preparation provided by the present disclosure will be described in detail below with reference to examples, but they should not be construed as limiting the protection scope of the present disclosure.

Example 1 Consistency Evaluation of a Traditional Extraction Process and a Modern Extraction Process of Xiaoxumingtang 1. Determination of the Evaluation Object This example takes Xiaoxumingtang (XXMT, also known as Xiaoxuming Decoction or Small Emergency Decoction) documented in the *Catalog of Ancient Classic Prescriptions* (*the First Batch*) as an example. This prescription comes from the *Essential Recipes for Emergent Use Worth A Thousand Gold* (by Sun Simiao in the Tang Dynasty) and is composed of 1 liang 13.8 g) each of *Ephedrae herba*, Stephaniae Tetrandrae *Radix, Ginseng radix* et *Rhizoma, Scutellariae radix, Cinnamomi cortex, Glycyrrhizae radix* et *Rhizoma, Paeoniae radix Alba, Chuanxiong rhizoma*, and *Armeniacae semen Amarum*, 15 g of *Aconiti Lateralis radix* Preparata, 1.5 liang (20.70 g) of *Saposhnikoviae radix*, and 5 liang (69.00 g) of *Zingiberis rhizoma* Recens. The above 12 herbs are crushed. The *Ephedrae herba* was boiled thrice with 1 dou and 2 sheng (2.4 L) of water and defoamed, and all herbs are put therein and decocted to 3 sheng (0.6 L). Based on the medical books and records of all previous dynasties, and according to the key information and ancient literature of ancient classic prescriptions released by China, a reference sample and modern extraction samples of XXMT were prepared on the basis of determining the origins of medicinal materials, medicinal parts, processing specifications, and converted doses. The specific method was shown as below:

(1) Preparation of the reference samples (by traditional extraction process): *Ephedrae herba*, Stephaniae Tetrandrae *Radix, Ginseng radix* et *Rhizoma, Scutellariae radix, Cinnamomi cortex, Glycyrrhizae radix* et *Rhizoma, Paeoniae radix Alba, Chuanxiong rhizoma, Armeniacae semen Amarum, Aconiti lateralis radix* Preparata, *Saposhnikoviae radix*, and *Zingiberis rhizoma* Recens were weighed at doses described in the ancient prescription, and crushed into 5-6 mm granules individually; the *Ephedrae herba* granules were put in a ceramic decoction pot with water and decocted with high heat until boiled; subsequently, the rest of the medicinal materials were put therein, decocted with high heat until boiled, held with slow heat until the volume of the decoction was appropriate; the decoction was filtered while it was hot, namely, the XXMT reference sample was obtained.

(2) Preparation of orthogonal test samples (by modern extraction process): The same batch of decoction pieces at the same prescription doses as the traditional process were weighed and extracted using three factors, solid-liquid ratio (A), extraction time (B), and extraction frequency (C), as objects of investigation as shown in Table 1, and m modern extraction samples were obtained.

that can represent the overall quality, such as fingerprints, extractum yield, and extractum should be used as evaluation indexes. There should be no fewer than two evaluation indexes that represent overall quality. Therefore, the quantity of overall evaluation indexes, n, should be at least 3. For the screening of evaluation indexes, refer to the *Guidance on Specifications for New TCM Drugs (Interim)*.

In this example, the measurement data of n (n=6) evaluation indexes, namely pseudoephedrine hydrochloride, ginsenoside Rg1, baicalin, paeoniflorin, fingerprint similarity, and extractum yield, were obtained from the orthogonal test samples and reference sample of XXMT. For details, see Table 2.

TABLE 2

Examples of raw data of XXMT

| Test No. | Mass fraction/mg · g$^{-1}$ | | | | | Extractum yield/% |
| --- | --- | --- | --- | --- | --- | --- |
| | Pseudoephedrine hydrochloride | Ginsenoside Rg1 | Baicalin | Paeoniflorin | Fingerprint similarity | |
| 1 | 4.09 | 1.70 | 63.87 | 18.28 | 0.997 | 14.48 |
| 2 | 7.28 | 2.20 | 98.86 | 20.61 | 0.995 | 21.17 |
| 3 | 9.00 | 2.25 | 103.16 | 23.69 | 0.991 | 23.32 |
| 4 | 5.74 | 2.04 | 91.59 | 21.73 | 0.997 | 18.89 |
| 5 | 10.48 | 3.19 | 118.50 | 23.12 | 0.133 | 22.78 |
| 6 | 6.28 | 1.74 | 98.33 | 17.98 | 0.996 | 16.18 |
| 7 | 7.80 | 2.64 | 108.30 | 21.19 | 0.996 | 21.43 |
| 8 | 4.17 | 1.88 | 66.55 | 14.27 | 0.994 | 14.08 |
| 9 | 8.81 | 2.20 | 104.39 | 19.83 | 0.991 | 20.88 |
| Reference sample | 4.46 | 1.80 | 64.05 | 12.99 | 1 | 16.09 |

TABLE 1

The L9($3^4$) orthogonal array of XXMT

| Test No. | Solid-liquid ratio (A) | Extraction time/h (B) | Extraction frequency (C) | Blank (D) |
| --- | --- | --- | --- | --- |
| 1 | 1:8 (1) | 0.5 (1) | 1 (1) | (1) |
| 2 | 1:8 (1) | 1 (2) | 2 (2) | (2) |
| 3 | 1:8 (1) | 1.5 (3) | 3 (3) | (3) |
| 4 | 1:10 (2) | 0.5 (1) | 2 (2) | (3) |
| 5 | 1:10 (2) | 1 (2) | 3 (3) | (1) |
| 6 | 1:10 (2) | 1.5 (3) | 1 (1) | (2) |
| 7 | 1:12 (3) | 0.5 (1) | 3 (3) | (2) |
| 8 | 1:12 (3) | 1 (2) | 1 (1) | (3) |
| 9 | 1:12 (3) | 1.5 (3) | 2 (2) | (1) |

2. Determination of Evaluation Indexes

The current idea of quality control of TCM is to control the quantities of one or more active pharmaceutical ingredients (APIs) or characteristic ingredients in for Chinese medicinal materials. Therefore, when the chemical composition was determined in this study, determination should be carried out by selecting substances that are closely related to the functional properties of Chinese medicinal materials and have definite chemical structures, those capable of qualitative identification and quantitative determination, and representative substances that follow the principle of preferring the sovereign drug and balancing minister, assistant and envoy drugs in the prescription according to the compatibility of TCM. In order to ensure the authenticity of the evaluation results, at least one chemical constituent in the composite prescription should be determined, so there should be at least one quantitative index. Also, the indexes 3. Calculation of the Relative Deviation The basic calculation principle is derived from the requirements of the *Technical Guiding Principles for Pharmaceutical Research of Traditional Chinese Medicine Compound Preparations Managed by the Catalog of Ancient Classic Prescriptions (Trial)*. The index component content fluctuates between 70% and 130% of the mean value of the reference sample, which meets all the quality standards. First of all, the quantity of evaluation indexes, n, and the quantity of samples, m, were determined. Therefore, in this example, the relative deviation ($Rd_{i,j}$) of $X_{i,j}$ relative to $S_j$ was calculated according to the following formula, so as to analyze the similarity of different samples to the reference sample more scientifically and comprehensively.

$$Rd_{i,j}=|X_{i,j}-S_j|/S_j$$

$Rd_{i,j}$ represents the relative deviation under the j-th (j=1, 2, ..., n) evaluation index of the i-th (i=1, 2, ..., m) sample. The calculation results are shown in Table 3. The smaller $Rd_{i,j}$ indicates the smaller deviation of $X_{i,j}$ relative to $S_j$, namely, the higher similarity of the sample to the reference sample.

TABLE 3

Relative deviations of orthogonal tests for XXMT

| Test No. | Pseudoephedrine hydrochloride | Ginsenoside Rg1 | Baicalin | Paeoniflorin | Similarity | Extractum yield |
|---|---|---|---|---|---|---|
| 1 | 0.08 | 0.06 | 0.00 | 0.41 | 0.00 | 0.10 |
| 2 | 0.63 | 0.22 | 0.54 | 0.59 | 0.01 | 0.32 |
| 3 | 1.02 | 0.25 | 0.61 | 0.82 | 0.01 | 0.45 |
| 4 | 0.29 | 0.13 | 0.43 | 0.67 | 0.00 | 0.17 |
| 5 | 1.35 | 0.77 | 0.85 | 0.78 | 0.87 | 0.42 |
| 6 | 0.41 | 0.04 | 0.54 | 0.38 | 0.00 | 0.01 |
| 7 | 0.75 | 0.47 | 0.69 | 0.63 | 0.00 | 0.33 |
| 8 | 0.06 | 0.04 | 0.04 | 0.10 | 0.01 | 0.12 |
| 9 | 0.98 | 0.22 | 0.63 | 0.53 | 0.01 | 0.30 |

4. Calculation of the Reference Correlation Degree

Because the relative deviation value cannot be comprehensively scored, and the meaning expressed by the value is not intuitive enough, it is not easy to understand and apply. Therefore, a method is further adopted to give each evaluation object an evaluation value, namely, the reference correlation degree. This method was based on the relative deviation of each orthogonal test sample and the reference sample under each index in Table 3, and then the reference correlation degree ($SR_{i,j}$) was calculated according to the following formula.

$$SR_{i,j}=(1-Rd_{i,j})\times 100\%$$

$SR_{i,j}$ represents the reference correlation degree under the j-th (j=1, 2, . . . , n) evaluation index of the i-th (i=1, 2, . . . , m) sample. The reference correlation degree being closer to 100% indicates that the samples prepared by the modern extraction process under this evaluation index are more similar to the reference sample. The calculation results are shown in Table 4. Therefore, in the next step, the weight coefficient of each index could be determined for comprehensive scoring by the AHP-information entropy weight method.

$$SR_{i,j}=(1-|X_{i,j}-S_j|/S_j)\times 100\%$$

TABLE 4

The reference correlation degree of orthogonal tests for XXMT

| Test No. | Pseudoephedrine hydrochloride % | Ginsenoside Rg1 % | Baicalin % | Paeoniflorin % | Fingerprint similarity % | Extractum yield % |
|---|---|---|---|---|---|---|
| 1 | 91.74 | 94.37 | 99.71 | 59.36 | 99.70 | 89.99 |
| 2 | 36.56 | 77.97 | 45.66 | 41.36 | 99.50 | 68.43 |
| 3 | −2.02 | 75.24 | 38.94 | 17.67 | 99.10 | 55.07 |
| 4 | 71.11 | 86.66 | 57.01 | 32.75 | 99.70 | 82.60 |
| 5 | −35.20 | 22.99 | 15.00 | 22.04 | 13.30 | 58.42 |
| 6 | 59.08 | 96.46 | 46.49 | 61.66 | 99.60 | 99.44 |
| 7 | 24.85 | 53.38 | 30.91 | 36.96 | 99.60 | 66.81 |
| 8 | 93.62 | 95.82 | 96.10 | 90.21 | 99.40 | 87.51 |
| 9 | 2.28 | 77.97 | 37.03 | 47.36 | 99.10 | 70.23 |

It can be seen from Table 4 that $SR_{i,j}$ being closer to 100% represents higher similarity of the modern extraction samples to the reference sample. The results showed that: when the content of pseudoephedrine hydrochloride and paeoniflorin was used as the evaluation index, the test number that was similar to the reference sample was 8; when the baicalin and the fingerprint similarity were used as evaluation indexes, the test number that was close to the reference sample was 1; when the ginsenoside Rg1 and the extractum yield were used as evaluation indexes, and the test number that was similar to the reference sample was 6. It concluded that the relevant extraction process parameters could not be determined until comprehensive scoring was conducted by the weighting method.

5. Calculation of the Combination Weight by the AHP-Information Entropy Weight Method 5.1 Subjective Weighting by AHP 5.1.1 Construction of an XXMT Judgment Matrix The construction of this judgment matrix follows the sovereign, minister, assistant and envoy principle of TCM. In XXMT, *Ephedrae herba*, as the sovereign drug, has the actions of dispelling wind-cold evil, sweating and resolving the exterior, and dissipates wind when compatible with acrid *Saposhnikoviae radix, Chuanxiong Rhizoma, Cinnamomi Cortex*, Stephaniae Tetrandrae *Radix*, and *Aconiti lateralis radix* Preparata; because all drugs share dissipating acridity when concomitantly used, bitter *Scutellariae Radix* along with sweet *Ginseng radix* et *Rhizoma* and *Paeoniae radix Alba*, as assistant drugs, can not only prevent Chinese medicinal materials with dissipating acridity from impairing the body fluid and consuming qi, but also tonify qi and nourish blood, and support the vital qi to outthrust evils.

According to the prescription composition of the XXMT, the API in the sovereign drug was preferred as a content determination index. Also, considering the correlation with the preparation method and stability, a quality standard control index was selected and determined in a targeted manner. Therefore, pseudoephedrine hydrochloride in *Ephedrae herba*, ginsenoside Rg1 in *Ginseng Radix* et *Rhizoma*, baicalin in *Scutellariae Radix*, and paeoniflorin in *Paeoniae radix Alba* were determined; meanwhile, fingerprints and extractum yield were used as quality control measures. Although fingerprints could reflect the profile and qualitative characteristics of small molecular components, they still contained less quality information compared with index components for content determination. Therefore, the fingerprints were regarded as important as the extractum yield. Therefore, the judgment matrix of the raw data was finally constructed in the following order: pseudoephedrine hydrochloride>ginsenoside Rg1>baicalin>paeoniflorin>fingerprint similarity≈extractum yield.

Subsequently, according to the AHP 1-9 scale for judgment matrix, scores were given according to the relative importance of n indexes in the same hierarchy, as shown in Table 5. Pseudoephedrine hydrochloride, as the main API of the sovereign drug in the prescription, was more important than ginsenoside Rg1, so it was marked as 2; it was more important than baicalin in *Scutellariae radix*, so it was marked as 4; it was significantly more important than paeoniflorin in *Paeoniae radix Alba*, so it was marked as 5; it was significantly more important than the fingerprint similarity and the extractum yield, so it was marked as 6, and so forth. Judgment matrix A was constructed according to the following formula. The data are shown in Table 6, where $a_{ef}$ represents a comparison result of factor e (e=1, 2, ..., n) compared with factor f (f=1, 2, ..., n).

$$A = (a_{ef})_{n \times n} = \begin{vmatrix} a_{11} & a_{12} & \ldots & a_{1n} \\ a_{21} & a_{22} & \ldots & a_{2n} \\ \vdots & \vdots & \ldots & \vdots \\ a_{n1} & a_{n2} & \ldots & a_{nn} \end{vmatrix}$$

TABLE 5

The criteria for constructing the judgment matrix by AHP

| Scale | Meaning |
| --- | --- |
| 1 | Indicate that both factors are of equal importance when comparing two factors |
| 3 | Indicate that the former is slightly more important than the latter when comparing two factors |
| 5 | Indicate that the former is significantly more important than the latter when comparing two factors |
| 7 | Indicate that the former is strongly more important than the latter when comparing two factors |
| 9 | Indicate that the former is extremely more important than the latter when comparing two factors |
| 2, 4, 6, and 8 | Indicate intermediate values between the above adjacent judgments |
| Reciprocal | If the importance ratio of the factor e to the factor f is $a_{ef}$, then the importance ratio of the factor f to the factor e is: $a_{ef} = 1/a_{ef}$ |

5.1.2 Weight Calculation

First, the judgment matrix A was geometrically averaged (by the square root method), and the initial weight coefficient $W_j'$ was calculated according to the following formula:

$$W_j' = \sqrt[n]{a_{j1} a_{j2} \ldots a_{jn}}$$

where $a_{jn}$ represents the comparison result of the j-th (j=1, 2, ..., n) evaluation index to the n-th (n=1, 2, ..., j) evaluation index.

Then, the normalized weight coefficient $W_j^s$ was calculated according to the following formula, and the weight coefficients of the six indexes were obtained as 0.420, 0.238, 0.143, 0.089, 0.055, and 0.055 in sequence.

$$W_j^s = W_j' / \sum_{j=1}^{n} W_j'$$

5.1.3 Consistency Checking

After the weight coefficient was obtained, consistency checking was conducted on the matrix, the consistency index (CI) and the consistency ratio (CR) were calculated, and the maximal characteristic root $\lambda_{max}$ was calculated according to the following formula.

$$\lambda_{max} = \left( \sum_{j=1}^{n} \frac{\sum_{j=1}^{n} a_{jn} W_j'}{W_j'} \right) / n$$

Then the CI was calculated according to the following formula, and the CI obtained was 0.02, and the CR (CR=CI/RI, where RI is the index of degree of freedom) was 0.01, both of which were less than 0.1, indicating that the matrix was consistent. If one of the CI and CR was greater than 0.1, the scoring was unreasonable and needed to be scored again.

CI=($\lambda_{max}$−n)/(n−1)

5.2 Objective Weighting Based on Information Entropy

5.2.1 Construction of a Raw Data Matrix of the Orthogonal Test for XXMT

There were m samples and n evaluation indexes. The raw data matrix was $R = X_{i,j})_{m \times n}$. The raw data matrix R was

TABLE 6

Judgment precedence matrix for pairwise comparison of indexes of XXMT

| Evaluation index | Pseudoephedrine hydrochloride | Ginsenoside Rg1 | Baicalin | Paeoniflorin | Fingerprint similarity | Extractum yield |
| --- | --- | --- | --- | --- | --- | --- |
| Pseudoephedrine hydrochloride | 1 | 2 | 4 | 5 | 6 | 6 |
| Ginsenoside Rg1 | ½ | 1 | 2 | 3 | 4 | 4 |
| Baicalin | ¼ | ½ | 1 | 2 | 3 | 3 |
| Paeoniflorin | ⅕ | ⅓ | ½ | 1 | 2 | 2 |
| Fingerprint similarity | ⅙ | ¼ | ⅓ | ½ | 1 | 1 |
| Extractum yield | ⅙ | ¼ | ⅓ | ½ | 1 | 1 | constructed using six indexes, namely the content of pseudoephedrine hydrochloride, ginsenoside Rg1, baicalin, and paeoniflorin, the fingerprint similarity, and the extractum yield, as evaluation indexes.

$$R = \begin{vmatrix} 4.09 & 7.28 & 9.00 & 5.74 & 10.48 & 6.28 & 7.80 & 4.17 & 8.81 \\ 1.70 & 2.20 & 2.25 & 2.04 & 3.19 & 1.74 & 2.64 & 1.88 & 2.20 \\ 63.87 & 98.86 & 103.16 & 91.59 & 118.50 & 98.33 & 108.30 & 66.55 & 104.39 \\ 18.28 & 20.61 & 23.69 & 21.73 & 23.12 & 17.98 & 21.19 & 14.27 & 19.93 \\ 0.997 & 0.995 & 0.991 & 0.997 & 0.133 & 0.996 & 0.996 & 0.994 & 0.991 \\ 14.48 & 21.17 & 23.32 & 18.89 & 22.78 & 16.18 & 21.43 & 14.08 & 20.88 \end{vmatrix}$$

5.2.2 Conversion of the Raw Data into a Probability Matrix

The raw data matrix R was converted into a probability matrix P according to the following formula, where $P_{i,j}$ represent the probability of the i-th (i=1, 2, . . . , m) sample under the j-th (j=1, 2, . . . , n) index.

$$P_{i,j} = X_{i,j} / \sum_{i=1}^{m} X_{i,j}$$

$$P = \begin{vmatrix} 0.0642 & 0.1144 & 0.1414 & 0.0902 & 0.1646 & 0.0986 & 0.1226 & 0.0655 & 0.1384 \\ 0.0857 & 0.1109 & 0.1133 & 00.1030 & 0.1608 & 0.0876 & 0.1332 & 0.0946 & 0.1109 \\ 0.0748 & 0.1158 & 0.1209 & 0.1073 & 0.1388 & 0.1152 & 0.1269 & 0.0780 & 0.1223 \\ 0.1011 & 0.1141 & 0.1311 & 0.1203 & 0.1280 & 0.0995 & 0.1172 & 0.0790 & 0.1098 \\ 0.1232 & 0.1230 & 0.1225 & 0.1232 & 0.0164 & 0.1231 & 0.1231 & 0.1229 & 0.1225 \\ 0.0836 & 0.1222 & 0.1346 & 0.1091 & 0.1351 & 0.0934 & 0.1237 & 0.0813 & 0.1205 \end{vmatrix}$$

5.2.3 Calculation of the Information Entropy and Weight Coefficient of Each Index of the XXMT According to the following formula, the information entropy ($H_j$) of each index was calculated as: 0.9799, 0.9912, 0.9919, 0.9956, 0.9690, and 0.9930 in sequence. If the smaller $H_j$ indicated higher degree of data dispersion under the j-th index, then the information quantity provided was greater:

$$H_j = -k \sum_{j=1}^{m} P_{ij} \ln P_{ij}, \; k = 1/\ln m$$

According to the following formula, the weight coefficients ($W_j^o$) of indexes were calculated as 0.254, 0.110, 0.101, 0.056, 0.391, and 0.088 in sequence.

$$W_j^o = (1 - H_j) / \sum_{j=1}^{n} (1 - H_j)$$

5.2.4 Determination of the Combination Weight of XXMT and Comprehensive Scoring The subjective weight coefficient was obtained by the AHP, and after the objective weight coefficient was obtained by the information entropy weight method, the weight coefficient of each index combination was calculated according to the following formula. The results are shown in Table 7.

$$W_j = \frac{W_j^s \times W_j^o}{\sum_{j=1}^{n} W_j^s \times W_j^o}$$

TABLE 7

The comprehensive weight coefficients of the XXMT

| Evaluation index | $W_j^s$ | $W_j^o$ | $W_j$ |
|---|---|---|---|
| Pseudoephedrine hydrochloride | 0.420 | 0.254 | 0.597 |
| Ginsenoside Rg1 | 0.143 | 0.101 | 0.081 |
| Baicalin | 0.238 | 0.110 | 0.147 |
| Paeoniflorin | 0.089 | 0.056 | 0.028 |
| Fingerprint similarity | 0.055 | 0.088 | 0.027 |
| Extractum yield | 0.055 | 0.391 | 0.120 |

The comprehensive weight coefficients of the pseudoephedrine hydrochloride ($Q_1$), the ginsenoside ($Q_2$), the baicalin ($Q_3$), paeoniflorin ($Q_4$), the fingerprint similarity ($Q_5$), and the extractum yield ($Q_6$) were obtained by the AHP-information entropy weight method, and then the comprehensive scores were calculated according to the following formula. The scoring results are shown in Table 8.

$$M = SR_{i,Q_1} \times 0.597 + SR_{i,Q_2} \times 0.081 + SR_{i,Q_3} \times 0.147 + SR_{i,Q_4} \times 0.028 + SR_{i,Q_5} \times 0.027 + SR_{i,Q_6} \times 0.120$$

TABLE 8

| The comprehensive scoring results of the XXMT | | | | | | | | | |
|---|---|---|---|---|---|---|---|---|---|
| Test No. | 1 | 2 | 3 | 4 | 5 | 6 | 7 | 8 | 9 |
| Comprehensive score (M) | 92.77 | 51.94 | 26.88 | 74.92 | −12.63 | 69.58 | 39.98 | 94.58 | 30.93 |

From the results in Table 8, it can be seen that the comprehensive score of test 8 is the highest, and the results indicate that the parameter of the modern process that is the most similar to the traditional extraction process is $A_3B_2C_1$, namely, the quality of the sample obtained by decoction with 12 times the quantity of water for 1 h is the most consistent with that of the reference sample.

6. XXMT Verification Test

According to the finally determined parameters of the extraction process, the verification test was conducted on the parameters of three batches of the modern extraction process and the traditional extraction process, and the content of pseudoephedrine hydrochloride, ginsenoside Rg1, baicalin and paeoniflorin, the fingerprint similarity and the extractum yield were determined. The measured values of the reference samples obtained by three traditional extractions were expressed as the average ($\overline{S_{i,j}}$). The comprehensive scores were calculated. The RSD values were all within 5%. The results are shown in Table 9.

TABLE 9

| | The results of the XXMT verification experiment | | | | | | |
|---|---|---|---|---|---|---|---|
| | Mass fraction/mg · g$^{-1}$ | | | | | | |
| No. | Pseudoephedrine hydrochloride | Ginsenoside Rg1 | Baicalin | Paeoniflorin | Fingerprint similarity | Extractum yield | Comprehensive score | RSD/% |
| 1 | 4.48 | 2.10 | 79.21 | 18.56 | 0.996 | 15.83 | 88.97 | |
| 2 | 4.63 | 2.10 | 75.93 | 18.66 | 0.999 | 16.36 | 85.86 | 2.29 |
| 3 | 4.55 | 2.10 | 66.28 | 18.48 | 0.994 | 15.12 | 89.64 | |
| $\overline{S_{i,j}}$ | 4.22 | 1.74 | 59.3 | 15.63 | 1 | 15.56 | / | / |
| Standard range | 2.95-5.49 | 1.22-2.26 | 41.51-77.09 | 10.94-20.32 | >0.9 | 10.89-20.23 | >70 | / |

It can be seen from Table 9 that: the modern extraction process of the XXMT obtained by the evaluation method based on the reference correlation degree and the AHP-information entropy weight method is stable and feasible, with high repeatability; the content of the index components of all samples is between 70% and 130% of the mean value of the reference samples, and the fingerprint similarity is greater than 0.9.

Example 2 Consistency Evaluation of Ancient and Modern Extraction Technology of Danggui Buxue Tang (Danggui Buxue Decoction)

1. Determination of the Evaluation Object

This example takes Danggui Buxue Tang (DBT, also known as Danggui Buxue Decoction) documented in the *Catalog of Ancient Classic Prescriptions* (*the First Batch*) as an example. This prescription comes from the *Clarification of Perplexities about Internal and External Damage* (by Li Dongyuan in the Jin Dynasty) and is composed of 1 liang (37.30 g) of *Astragali radix* and 2 qian (7.44 g) of *Angelicae sinensis radix* (washed with alcohol). The above decoction pieces are chewed carefully and all regarded as one dose. The above decoction pieces are decocted with two bowls of water until one bowl, and dregs of the decoction are removed. The decoction is taken warm before meals. Based on the medical books and records of all previous dynasties, and according to the key information and ancient literature of ancient classic prescriptions released by China, a reference sample and modern extraction samples of DBT were prepared on the basis of determining the origins of medicinal materials, medicinal parts, processing specifications, and converted doses. The specific method was shown as below:

(1) Preparation of the reference samples (by traditional extraction process): *Astragali radix* and *Angelicae sinensis radix* were weighed at doses described in the ancient prescription, and crushed into 5-6 mm granules individually; the resulting granules were put in a ceramic decoction pot with a volume of water, boiled with high heat, and then decocted to a proper volume over a slow fire; the decoction was filtered while it was hot, and cooled, namely, the DBT reference sample was obtained.

(2) Preparation of orthogonal test samples (by modern extraction process): The same batch of decoction pieces at the same prescription doses as the traditional extraction process were weighed and extracted using three factors, solid-liquid ratio (A), extraction time (B), and extraction frequency (C), as objects of investigation as shown in Table 10, and m modern extraction samples were obtained.

TABLE 10

| | The L9($3^4$) orthogonal array of DBT | | | |
|---|---|---|---|---|
| No. | Solid-liquid ratio (A) | Extraction (Decoction) time (B) | Extraction (Decoction) frequency (C) | Blank (D) |
| 1 | 1:6 (1) | 0.5 (1) | 1 | (1) |
| 2 | 1:6 (1) | 1 (2) | 2 (2) | (2) |
| 3 | 1:6 (1) | 1.5 (3) | 3 (3) | (3) |
| 4 | 1:8 (2) | 0.5 (1) | 2 (2) | (3) |
| 5 | 1:8 (2) | 1 (2) | 3 (3) | (1) |
| 6 | 1:8 (2) | 1.5 (3) | 1 (1) | (2) |
| 7 | 1:10 (3) | 0.5 (1) | 3 (3) | (2) |
| 8 | 1:10 (3) | 1 (2) | 1 (1) | (3) |
| 9 | 1:10 (3) | 1.5 (3) | 2 (2) | (1) |

2. Determination of Evaluation Indexes

When selecting evaluation indexes, at least one quantitative index should be selected. Considering the measurability, calycosin-7-O-β-D-glucoside, astragaloside (APIs in the sovereign drug *Astragali radix*), and ferulic acid (an API in the minister drug *Angelicae sinensis radix*) were selected for evaluation in combination with two overall quality evaluation indexes, fingerprints and extractum yield.

The determination data of n indexes (n=5), namely calycosin-7-O-β-D-glucoside, astragaloside, ferulic acid, fingerprint similarity, and extractum yield, were obtained from the DBT reference sample and the orthogonal test samples. For details, see Table 11.

TABLE 11

Examples of the raw data of the DBT

| | Mass fraction/mg · g | | | | |
|---|---|---|---|---|---|
| No. | Calycosin-7-O-β-D-glucoside | Astragaloside | Ferulic acid | Fingerprint similarity | Extractum yield/% |
| 1 | 0.29 | 0.51 | 0.64 | 0.996 | 18.58 |
| 2 | 0.52 | 0.84 | 0.89 | 0.991 | 29.91 |
| 3 | 0.94 | 1.12 | 0.99 | 0.154 | 40.14 |
| 4 | 0.34 | 0.68 | 0.77 | 0.995 | 22.02 |
| 5 | 0.73 | 1.31 | 1.07 | 0.595 | 38.80 |
| 6 | 0.46 | 0.69 | 0.82 | 0.984 | 27.14 |
| 7 | 0.61 | 0.93 | 0.87 | 0.982 | 31.28 |
| 8 | 0.36 | 0.55 | 0.68 | 0.997 | 21.02 |
| 9 | 0.69 | 0.75 | 1.04 | 0.845 | 33.13 |
| Reference sample | 0.32 | 0.60 | 0.75 | 1 | 21.72 |

3. Calculation of the Relative Deviation

Referring to Example 1, the relative deviation of the orthogonal test sample of the DBT was calculated according to the formula $Rd_{i,j}=|X_{i,j}-S_j|/S_j$. The results are shown in Table 12.

TABLE 12

Relative deviations of orthogonal tests for DBT

| No. | Calycosin-7-O-β-D-glucoside | Astragaloside | Ferulic acid | Fingerprint similarity | Extractum yield |
|---|---|---|---|---|---|
| 1 | 0.09 | 0.15 | 0.15 | 0.00 | 0.14 |
| 2 | 0.63 | 0.40 | 0.19 | 0.01 | 0.38 |
| 3 | 1.94 | 0.87 | 0.32 | 0.85 | 0.85 |
| 4 | 0.06 | 0.13 | 0.03 | 0.01 | 0.01 |
| 5 | 1.28 | 1.18 | 0.43 | 0.41 | 0.79 |
| 6 | 0.44 | 0.15 | 0.09 | 0.02 | 0.25 |
| 7 | 0.91 | 0.55 | 0.16 | 0.02 | 0.44 |
| 8 | 0.13 | 0.08 | 0.09 | 0.00 | 0.03 |
| 9 | 1.16 | 0.25 | 0.39 | 0.16 | 0.53 |

4. Calculation of the Reference Correlation Degree

Referring to Example 1, the reference correlation degree of the orthogonal test sample of the DBT was calculated according to the formula $SR_{i,j}=(1-Rd_{i,j})\times 100\%$. The results are shown in Table 13.

TABLE 13

The reference correlation degree of orthogonal tests for DBT

| No. | Calycosin-7-O-β-D-glucoside | Astragaloside | Ferulic acid | Fingerprint similarity | Extractum yield |
|---|---|---|---|---|---|
| 1 | 90.63 | 85.00 | 85.33 | 99.60 | 85.54 |
| 2 | 37.50 | 60.00 | 81.33 | 99.10 | 62.29 |
| 3 | −93.75 | 13.33 | 68.00 | 15.40 | 15.19 |
| 4 | 93.75 | 86.67 | 97.33 | 99.50 | 98.62 |
| 5 | −28.13 | −18.33 | 57.33 | 59.50 | 21.36 |
| 6 | 56.25 | 85.00 | 90.67 | 98.40 | 75.05 |
| 7 | 9.38 | 45.00 | 84.00 | 98.20 | 55.99 |
| 8 | 87.50 | 91.67 | 90.67 | 99.70 | 96.78 |
| 9 | −15.63 | 75.00 | 61.33 | 84.50 | 47.47 |

As can be seen from Table 13, when the calycosin-7-O-β-D-glucoside was used as the evaluation index, the test number that was similar to the reference sample was 4; when the astragaloside and the fingerprint similarity were used as evaluation indexes, the test number that was similar to the reference sample was 8; when the ferulic acid was used as the evaluation index, the test number that was similar to the reference sample was 4; when the extractum yield was used as the evaluation index, the test number that was similar to the reference sample was 4. Therefore, relevant extraction process parameters could not be determined until comprehensive scoring was conducted by the weighting method.

5. Calculation of the Combination Weight by the AHP-Information Entropy Weight Method

5.1 Subjective Weighting by AHP

The judgment matrix was constructed according to the sovereign, minister, assistant and envoy principle of TCM. In DBT, the compatibility ratio of *Astragali radix* to *Angelicae Sinensis radix* was 5:1. *Astragali radix* invigorates qi, and *Angelicae Sinensis Radix* is to nourish blood. The visible blood cannot be generated rapidly, the invisible qi should be secured urgently, the visible blood originates from the invisible qi, and hematogenesis can be achieved by invigorating qi. Therefore, the dosage of *Astragali radix* is multiple times that of *Angelicae Sinensis Radix*. The *Astragali radix* is a sovereign drug, while the *Angelicae Sinensis Radix* is a minister drug. Therefore, the judgment matrix of the raw data was constructed based on the importance of astragaloside>calycosin-7-O-β-D-glucoside>ferulic acid>fingerprint similarity≈extractum yield, and scores were given with reference to the method of Example 1. Both calycosin-7-O-β-D-glucoside and astragaloside were main APIs of the sovereign drug *Astragali radix* in the prescription. However, the astragaloside was slightly more important than the calycosin-7-O-β-D-glucoside, so it was marked as 2; it was slightly more important than the ferulic acid in *Angelicae sinensis radix*, so it was marked as 3; it was significantly more important than the fingerprint similarity and the extractum yield, so it was marked as 4; and so forth. A judgment matrix was constructed. The results are shown in Table 14.

TABLE 14

Judgment precedence matrix for pairwise comparison of indexes of DBT

| Evaluation index | Astragaloside | Calycosin-7-O-β-D-glucoside | Ferulic acid | Fingerprint similarity | Extractum yield |
|---|---|---|---|---|---|
| Astragaloside | 1 | 2 | 3 | 4 | 4 |
| Calycosin-7-O-β-D-glucoside | ½ | 1 | 2 | 3 | 3 |
| Ferulic acid | ⅓ | ½ | 1 | 2 | 2 |
| Fingerprint similarity | ¼ | ⅓ | ½ | 1 | 1 |
| Extractum yield | ¼ | ⅓ | ½ | 1 | 1 |

According to the calculation formula of the weight coefficient obtained by the AHP in Example 1, $$W_j^s = \sqrt[n]{a_{j1}a_{j2}\cdots a_{jn}} / \sum_{j=1}^{n} W_j',$$

the subjective weight coefficients ($W_j^s$) of the astragaloside, the calycosin-7-O-β-D-glucoside, the ferulic acid, the fingerprint similarity, and the extractum yield were calculated as 0.414, 0.258, 0.153, 0.088, and 0.088 in sequence. Finally, the consistency checking was carried out, and both the CI (0.009) and the CR (0.008) were less than 0.1, indicating that the judgment matrix was constructed reasonably and the data obtained were authentic.

5.2 Objective Weighting Based on Information Entropy

According to the method of Example 1, a raw data matrix of the orthogonal test for DBT was established. There were m samples of the orthogonal test for DBT and n evaluation indexes. The raw data matrix was $R=(X_{i,j})_{m\times n}$. The raw data matrix R was constructed using five indexes, namely the content of astragaloside, calycosin-7-O-β-D-glucoside, and ferulic acid, the fingerprint similarity, and the extractum yield, as the evaluation indexes.

$$R = \begin{vmatrix} 0.29 & 0.52 & 0.94 & 0.34 & 0.73 & 0.46 & 0.61 & 0.36 & 0.69 \\ 0.51 & 0.84 & 1.12 & 0.68 & 1.31 & 0.69 & 0.93 & 0.55 & 0.75 \\ 0.64 & 0.89 & 0.990 & 0.77 & 1.07 & 0.82 & 0.87 & 0.68 & 1.04 \\ 0.996 & 0.991 & 0.154 & 0.995 & 0.595 & 0.984 & 0.982 & 0.997 & 0.845 \\ 18.58 & 29.91 & 40.14 & 22.02 & 38.80 & 27.14 & 31.28 & 21.02 & 33.13 \end{vmatrix}$$

The raw data matrix was converted into a probability matrix P, as follows:

$$P = \begin{vmatrix} 0.0575 & 0.1032 & 0.1865 & 0.0688 & 0.1448 & 0.0913 & 0.1210 & 0.0714 & 0.1369 \\ 0.0691 & 0.1138 & 0.1518 & 0.0921 & 0.1775 & 0.0935 & 0.1260 & 0.0745 & 0.1016 \\ 0.0824 & 0.1145 & 0.1274 & 0.0991 & 0.1377 & 0.1055 & 0.1120 & 0.0875 & 0.1338 \\ 0.1321 & 0.1314 & 0.0204 & 0.1320 & 0.0789 & 0.1305 & 0.1303 & 0.1322 & 0.1121 \\ 0.0709 & 0.1142 & 0.1532 & 0.0840 & 00.1481 & 0.1036 & 0.1194 & 0.0802 & 0.1264 \end{vmatrix}$$

The information entropy value of each evaluation index of the DBT was calculated with reference to the formula in Example 1, $$H_j = -k\sum_{j=1}^{m} P_{ij}\ln P_{ij}, k = 1/\ln m,$$

and the information entropy values ($H_j$) of the calycosin-7-O-β-D-glucoside, the astragaloside, the ferulic acid, the fingerprint similarity, and the extractum yield were calculated as 0.9699, 0.9800, 0.9937, 0.9673, and 0.9859 in sequence. According to the formula $$W_j^o = (1-H_j)/\sum_{j=1}^{n}(1-H_j),$$

the objective weight coefficients ($W_j^o$) of the calycosin-7-O-β-D-glucoside, the astragaloside, the ferulic acid, the fingerprint similarity, and the extractum yield were finally calculated as 0.194, 0.294, 0.061, 0.316, and 0.137 in sequence.

5.3 Determination of the Combination Weight of DBT and Comprehensive Scoring The comprehensive weight coefficient of the DBT was calculated according to the method of Example 1. The results are shown in Table 15.

TABLE 15

The comprehensive weight coefficients of the DBT

| Evaluation index | $W_j^s$ | $W_j^o$ | $W_j$ |
|---|---|---|---|
| Astragaloside | 0.258 | 0.294 | 0.227 |
| Calycosin-7-O-β-D-glucoside | 0.414 | 0.194 | 0.549 |
| Ferulic acid | 0.153 | 0.061 | 0.043 |
| Fingerprint similarity | 0.088 | 0.316 | 0.127 |
| Extractum yield | 0.088 | 0.137 | 0.055 |

The comprehensive weight coefficients of the astragaloside ($Q_1$), the calycosin-7-O-β-D-glucoside ($Q_2$), the ferulic acid ($Q_3$), the fingerprint similarity ($Q_4$), and the extractum yield ($Q_5$) were obtained by the AHP-information entropy weight method, and the comprehensive scores were calculated according to the following formula. The scoring results are shown in Table 16.

$$M = SR_{i,Q_1}\times 0.227 + SR_{i,Q_2}\times 0.549 + SR_{i,Q_3}\times 0.043 + SR_{i,Q_4}\times 0.127 + SR_{i,Q_5}\times 0.055$$

TABLE 16

| Comprehensive scoring of the DBT | | | | | | | | | |
|---|---|---|---|---|---|---|---|---|---|
| Test No. | 1 | 2 | 3 | 4 | 5 | 6 | 7 | 8 | 9 |
| Comprehensive score (M) | 89.98 | 53.64 | 42.72 | 93.29 | 8.45 | 70.62 | 34.45 | 90.63 | 24.39 |

It can be seen from Table 16: Test 8 has the highest comprehensive score, and the result shows that the parameter of the modern process that is the most similar to the ancient method is $A_2B_1C_2$, namely, the quality of the sample obtained by decoction with 8 times the quantity of water for 0.5 h twice is the most consistent that of the reference sample.

6. DBT Verification Test

According to the finally determined parameters of the extraction process, the verification test was conducted on the parameters of three batches of the modern extraction process and the traditional extraction process, and the content of astragaloside, calycosin-7-O-β-D-glucoside, and ferulic acid, the fingerprint similarity, and the extractum yield were determined. The measured values of the reference samples obtained by three traditional extractions were expressed as the average ($\overline{S_{i,j}}$). The comprehensive scores were calculated. The RSD values were all within 5%. The results are shown in Table 17.

TABLE 17

The results of the DBT verification experiment

| | Mass fraction/mg · g | | | | | | |
|---|---|---|---|---|---|---|---|
| No. | Astragaloside | Calycosin-7-O-β-D-glucoside | Ferulic acid | Fingerprint similarity | Extractum yield/% | Comprehensive score | RSD/% |
| 1 | 0.58 | 0.44 | 0.69 | 0.995 | 20.99 | 88.32 | |
| 2 | 0.66 | 0.41 | 0.78 | 0.997 | 21.97 | 91.68 | 1.91 |
| 3 | 0.64 | 0.43 | 0.81 | 0.998 | 22.08 | 89.43 | |
| $\overline{S_{i,j}}$ | 0.61 | 0.37 | 0.73 | 1 | 21.05 | / | / |
| Standard range | 0.43-0.79 | 0.25-0.47 | 0.51-0.95 | >0.9 | 14.74-27.36 | / | / |

It can be seen from Table 17 that: the modern extraction process of the DBT obtained by the evaluation method based on the reference correlation degree and the AHP-information entropy weight method is stable and feasible, with high repeatability; the content of the index components of all samples is between 70% and 130% of the mean value of the reference samples, and the fingerprint similarity is greater than 0.9.

The decoction methods of classic famous prescriptions, Xiaoxumingtang and Danggui Buxue Tang, are implemented according to ancient records. The decoction pieces need to be crushed, namely, the decoction pieces are crushed into granules of a certain size; water is used as the extraction solvent, and finally, the extraction time is determined according to the water loss. However, decoction pieces are mostly fed in modern technology, and most of the extraction processes are "closed" reflux extraction processes, which are inconsistent with the actual industrial production. Therefore, the traditional extraction processs should be fully compared with the actual industrial production, and the extraction process should be evaluated as a whole with the quality of the reference sample as an index. The extraction time, the extraction frequency, and the water addition are deeply investigated to determine the parameters of the modern extraction process substantially consistent with the traditional extraction process.

The present disclosure proposes a concept of reference correlation degree for the first time. According to this method, the data are converted into an optimal vector capable of comprehensive evaluation, namely, the reference correlation degree, and key evaluation parameters between traditional and modern extraction processs are established. The evaluation method is simple and easy to understand, which builds a bridge for the transformation of traditional extraction processs into modern extraction processs, and realizes a key step in the transformation of TCM compound preparations into modern production processes.

The AHP is a subjective weighting method that artificially determines the importance of evaluation indexes, but human influence factors are relatively large because different people may have different opinions; the entropy weight method is an objective weighting method, which obtains a final weight coefficient according to the change law of the data, but cannot reflect the relationship between sovereign, minister, assistant and envoy drugs of TCM. An AHP-entropy weight method adopted in the present disclosure is a combination of the subjective weighting method with the objective weighting method to comprehensively determine the weight coefficient, and the obtained data are systematic and comprehensive.

As can be seen from the above two examples, the present disclosure has the following advantages:

1. The reference correlation degree initiated by the present disclosure solves the problem of selecting the most similar alternative solution, rather than the optimal one, in the case of considering a plurality of attributes of the TCM compound preparation at the same time. The reference correlation degree overcomes the problem that TCM compound preparations cannot organically combine multi-index evaluation with research on TCM compound preparations and give corresponding weights and comprehensive scores to influencing factors according to their importance.

2. A single index or incomplete selection of indexes may lead to biased evaluation, and it is often unreasonable to use a single index to evaluate things. Therefore, it is necessary to collect and summarize relevant information in combination with the characteristics of the object per se to obtain comprehensive indexes, so as to reflect whether the things satisfy expectations on the whole. Thus, the present disclosure stipulates that at least one quantitative evaluation index and two indexes that represent overall quality attributes are used for evaluation, which can enrich the information quantity contained in evaluation results and make it more credible.

3. In the examples, a combination of the subjective weighting method and the objective weighting method is used for comprehensive evaluation, because use of either weighting method alone will cause information loss. Therefore, to reduce the information loss, both methods should be organically combined, which reflects the subjective will of a decision maker, but does not depart from actual data, making a final weighting result more persuasive.

4. The reference correlation degree combined with the subjective and objective weighting methods can investigate TCM compound preparations comprehensively, thereby providing a better idea for process exploration and quality evaluation thereof.

The above descriptions are merely preferred implementations of the present disclosure. It should be noted that several improvements and modifications may further be made by a person of ordinary skill in the art without departing from the principle of the present disclosure, and such improvements and modifications should be deemed as falling within the protection scope of the present disclosure.

What is claimed is:

1. A consistency evaluation method for a traditional extraction process and a modern extraction process of a traditional Chinese medicine (TCM) compound preparation, comprising the following steps:

S1, extracting the TCM compound preparation by using the modern extraction process to obtain a modern extraction sample;

S2, determining evaluation indexes of a reference sample and the modern extraction sample to obtain measurement data of each evaluation index of the reference sample and the modern extraction sample, wherein the reference sample is obtained by extracting the TCM compound preparation by the traditional extraction process;

S3, based on the measurement data of each evaluation index of the reference sample, calculating a relative deviation of each evaluation index of the modern extraction sample;

S4, according to the relative deviation of each evaluation index, calculating the reference correlation degree of each evaluation index;

S5, determining a subjective weight coefficient and an objective weight coefficient of each evaluation index using a subjective weighting method and an objective weighting method based on the measurement data of each evaluation index of the modern extraction sample; calculating a comprehensive weight coefficient according to the subjective weight coefficient and the objective weight coefficient; and S6, conducting comprehensive scoring on the reference correlation degree of each evaluation index to obtain a score of the modern extraction sample according to the comprehensive weight coefficient, wherein there is no order of precedence between steps 4 and 5.

2. The method according to claim 1, wherein a quantity of the evaluation indexes is ≥3; the evaluation indexes comprises at least one quantitative evaluation index and at least two evaluation indexes that represent overall quality attributes.

3. The method according to claim 1, wherein the traditional extraction process comprises processing.

4. The method according to claim 1, wherein the relative deviation has a calculation formula represented by formula 1:

$$Rd_{i,j}=|X_{i,j}-S_j|/S_j \qquad \text{formula 1;}$$

wherein $X_{i,j}$ represents a measured value under a j-th (j=1, 2, ..., n) evaluation index of an i-th (i=1, 2, ..., m) sample from modern extraction samples; $S_j$ represents the measured value under the j-th (j=1, 2, ..., n) evaluation index of the reference sample; $Rd_{i,j}$ represents the relative deviation under the j-th (j=1, 2, ..., n) evaluation index of an i-th (i=1, 2, ..., m) sample.

5. The method according to claim 4, wherein the reference correlation degree has a calculation formula represented by formula 2:

$$SR_{i,j}=(1-Rd_{i,j})\times 100\% \qquad \text{formula 2;}$$

wherein $SR_{i,j}$ represents the reference correlation degree under the j-th (j=1, 2, ..., n) evaluation index of the i-th (i=1, 2, ..., m) sample.

6. The method according to claim 1, wherein the reference correlation degree has a calculation formula represented by formula 2:

$$SR_{i,j}=(1-Rd_{i,j})\times 100\% \qquad \text{formula 2;}$$

wherein $SR_{i,j}$ represents the reference correlation degree under the j-th (j=1, 2, ..., n) evaluation index of the i-th (i=1, 2, ..., m) sample.

7. The method according to claim 1, wherein the subjective weighting method comprises an analytical hierarchy process (AHP), a least squares method, a G1 method, a Delphi method, a binomial coefficient method, or a decision alternative ratio evaluation (DARE) system.

8. The method according to claim 7, wherein the subjective weighting method is the AHP; and the objective weighting method is the information entropy weight method.

9. The method according to claim 7, wherein the comprehensive weight coefficient has a calculation formula represented by formula 3:

$$W_j = \frac{W_j^s \times W_j^o}{\sum_{j=1}^{n} W_j^s \times W_j^o}; \qquad \text{formula 3}$$

where $W_j^o$ represents the objective weight coefficient under a j-th (j=1, 2, ..., n) evaluation index, and $W_j^s$ represents the subjective weight coefficient under the j-th (j=1, 2, ..., n) evaluation index.

10. The method according to claim 1, wherein the objective weighting method comprises an information entropy weight method, a principal component analysis (PCA), a mean square error method, or a multi-objective programming (MOP) method.

11. The method according to claim 10, wherein the subjective weighting method is the AHP; and the objective weighting method is the information entropy weight method.

12. The method according to claim 10, wherein the comprehensive weight coefficient has a calculation formula represented by formula 3:

$$W_j = \frac{W_j^s \times W_j^o}{\sum_{j=1}^{n} W_j^s \times W_j^o}; \qquad \text{formula 3}$$

where $W_j^o$ represents the objective weight coefficient under a j-th (j=1, 2, ..., n) evaluation index, and $W_j^s$ represents the subjective weight coefficient under the j-th (j=1, 2, ..., n) evaluation index.

13. The method according to claim 1, wherein the subjective weighting method is the AHP; and the objective weighting method is the information entropy weight method.

14. The method according to claim 1, wherein the comprehensive weight coefficient has a calculation formula represented by formula 3:

$$W_j = \frac{W_j^s \times W_j^o}{\sum_{j=1}^{n} W_j^s \times W_j^o}; \qquad \text{formula 3}$$

where $W_j^o$ represents the objective weight coefficient under a j-th (j=1, 2, ..., n) evaluation index, and $W_j^s$ represents the subjective weight coefficient under the j-th (j=1, 2, ..., n) evaluation index.

15. The method according to claim 1, wherein the comprehensive scoring has a calculation formula represented by formula 4:

$$M = \sum_{j=1}^{n} SR_{ij} \times W_j; \qquad \text{formula 4}$$

wherein $SR_{i,j}$ represents the reference correlation degree under a j-th (j=1, 2, ..., n) evaluation index of an i-th (i=1, 2, ..., m) sample; $W_j$ is the comprehensive weight coefficient under the j-th (j=1, 2, ..., n) evaluation index.

\* \* \* \* \*